(12) United States Patent
Jehle et al.

(10) Patent No.: US 10,971,917 B2
(45) Date of Patent: Apr. 6, 2021

(54) PRIMARY-PULSED SWITCHING POWER SUPPLY

(71) Applicant: Endress+Hauser SE+Co. KG, Maulburg (DE)

(72) Inventors: Max Jehle, Wehr (DE); Max Bauer, Rheinfelden (DE); Patrick Geib, Bad Säckingen (DE)

(73) Assignee: Endress+Hauser SE+Co. KG, Maulburg (DE)

( * ) Notice: Subject to any disclaimer, the term of this patent is extended or adjusted under 35 U.S.C. 154(b) by 0 days.

(21) Appl. No.: 16/615,169

(22) PCT Filed: May 9, 2018

(86) PCT No.: PCT/EP2018/062059
§ 371 (c)(1),
(2) Date: Nov. 20, 2019

(87) PCT Pub. No.: WO2018/215215
PCT Pub. Date: Nov. 29, 2018

(65) Prior Publication Data
US 2020/0177086 A1    Jun. 4, 2020

(30) Foreign Application Priority Data
May 24, 2017   (DE) ..................... 10 2017 111 431.9

(51) Int. Cl.
*H02H 3/02*       (2006.01)
*H02H 7/10*       (2006.01)
(Continued)

(52) U.S. Cl.
CPC ............ *H02H 3/023* (2013.01); *H02H 3/20* (2013.01); *H02H 7/12* (2013.01); *H02H 7/1213* (2013.01);
(Continued)

(58) Field of Classification Search
CPC   H02H 3/00; H02H 3/02; H02H 3/023; H02H 3/20; H02H 3/202; H02H 7/12;
(Continued)

(56) References Cited

U.S. PATENT DOCUMENTS 5,784,231 A   7/1998 Majid et al.
9,276,483 B2  3/2016 Yang et al.
(Continued)

FOREIGN PATENT DOCUMENTS

CA          982228       1/1976
CN        1238072 A     12/1999
(Continued)

OTHER PUBLICATIONS

Wikipedia, Überstromschutzeinrichtung, https://de.wikipedia.org/w/index.php?title=Ümberstromschutzeinrichtung, 2 pp. (last accessed Mar. 23, 2018).

(Continued)

*Primary Examiner* — Gary L Laxton
(74) *Attorney, Agent, or Firm* — Mark A. Logan; Endress+Hauser (USA) Holding Inc.

(57) ABSTRACT

Disclosed is a primary-clocked switching power supply for converting an input voltage into an output voltage, comprising: a primary side circuit branch, where the input voltage can be applied; isolated from the primary side circuit branch, a secondary side circuit branch, where the output voltage is tappable; between the primary side and the secondary side circuit branch, a galvanic isolation; a fuse or circuit breaker arranged in the primary side circuit branch; a first switchable switch element arranged in the primary side circuit branch such that switching trips the primary side fuse or circuit breaker; and a monitoring unit connected with the first switch element and arranged in the primary side circuit branch and adapted to monitor a characteristic electrical (Continued)

signal determined by the second primary winding and, when the characteristic electrical signal exceeds a threshold value, to switch the first switch element.

15 Claims, 2 Drawing Sheets

(51) Int. Cl.
*H02H 3/20* (2006.01)
*H02H 7/12* (2006.01)
*H02M 1/36* (2007.01)
*H02M 3/335* (2006.01)
*H02M 1/32* (2007.01)
*H02M 1/00* (2006.01)

(52) U.S. Cl.
CPC ......... *H02M 1/36* (2013.01); *H02M 3/33523* (2013.01); *H02M 1/32* (2013.01); *H02M 3/33507* (2013.01); *H02M 2001/0006* (2013.01)

(58) Field of Classification Search
CPC ...... H02H 7/203; H02H 7/122; H02H 7/1227; H02H 7/125; H02H 7/1252; H02H 7/10
See application file for complete search history.

(56) References Cited

U.S. PATENT DOCUMENTS

| | | | |
|---|---|---|---|
| 2014/0185333 A1 | 7/2014 | Yang | |
| 2014/0198337 A1* | 7/2014 | Nakajima | G03G 15/5004 358/1.14 |
| 2014/0254210 A1* | 9/2014 | Hayasaki | G03G 15/80 363/21.12 |
| 2016/0329824 A1* | 11/2016 | Sugahara | H02M 5/458 |

FOREIGN PATENT DOCUMENTS

| | | |
|---|---|---|
| CN | 102055346 A | 5/2011 |
| CN | 102792538 A | 11/2012 |
| DE | 3341074 A1 | 5/1985 |
| DE | 102013112300 A1 | 5/2015 |
| DE | 112014006836 T5 | 4/2017 |
| DE | 102016109649 A1 | 11/2017 |
| EP | 0360908 A1 | 4/1990 |
| EP | 2065993 A1 | 6/2009 |
| EP | 2765696 A1 | 8/2014 |
| JP | 2007043822 A | 2/2007 |
| JP | 2013074737 A | 4/2013 |

OTHER PUBLICATIONS

Tietze, Dr.-Ing. Urich, Schenk, Dr. Christoph, Halbleiter-Schaltungstechnik, www.springer.de/engine-de/tietze-schenk/, 1999, 4 pp.

* cited by examiner

PRIMARY-PULSED SWITCHING POWER SUPPLY

CROSS-REFERENCE TO RELATED APPLICATIONS

The present application is related to and claims the priority benefit of German Patent Application No. 10 2017 111 431.9, filed on May 24, 2017 and International Patent Application No. PCT/EP2018/062059, filed on May 9, 2018, the entire contents of which are incorporated herein by reference.

TECHNICAL FIELD

The invention relates to a primary-pulsed, or primary-clocked, switching power supply as well as to a field device having such a switching power supply.

BACKGROUND

Switching power supplies are currently used in practically all electronic devices, both in the private consumer field, for example, in the case of television sets, as well as also in the industrial environment, for example, in the case of field devices of automation technology.

Field devices of automation technology are used for registering and/or influencing process variables. Examples of such field devices are fill level measuring devices, mass flow measuring devices, pressure- and temperature measuring devices, pH-redox potential-measuring devices, conductivity measuring devices, etc., which, as sensors, register the corresponding process variables, fill level, flow, pressure, temperature, pH value, and conductivity value. Applied for influencing process variables are so-called actuators, e.g. valves, which control the flow of a liquid in a pipe, tube or pipeline section, or pumps, which change the fill level in a container. Referred to as field devices are, thus, in principle, all devices, which are applied near to the process and which deliver, or process, process relevant information. In connection with the invention, the concept, field device, thus, refers to all types of measuring devices and actuators. Furthermore, the concept, field device, includes also e.g. gateways, radio adapters and other bus participants integrated/integrable in a bus system.

A large number of such field devices are manufactured and sold by the group of firms, Endress+Hauser.

As already mentioned, such field devices require an energy supply. For this, so-called primary-clocked switching power supplies are currently applied, which, in general, have a galvanic isolation between a primary side, where an input voltage can be fed in, and a secondary side, where an output voltage is tappable. The energy is transmitted to the secondary side, in such case, by a high clocking of a transformer.

In order upon malfunction to avoid a turning off of the switching power supply and so to avoid a damaging of a downstream device, especially a field device, safety measures are implemented in the switching power supply. Thus, currently so-called crowbar circuits are applied, which as a last resort limit the output voltage of the switching power supply. In the case of such crowbar circuits, upon a malfunction, especially upon an overvoltage, a secondary side thyristor is fired, which causes a short circuit between the output voltage and a ground. In this way, the secondary side electrical current rises to the extent that a fuse melts or a circuit breaker trips and the secondary side electrical current is interrupted, so that the electrical circuit of the downstream device is isolated from the primary side of the switching power supply. At the same time, however, also a control loop, which likewise typically has a switching power supply, is isolated from the primary side of the switching power supply, so that the switching power supply detects primary side that the secondary side output voltage is too low and the control loop correspondingly tries to counteract this. Such, in turn, has the result that due to the open secondary side the output voltage can rise to several 100 volts. The introduced power can, however, only be removed via a primary side circuit branch region with an additional primary winding of the transformer, whereupon this primary side circuit branch region is extremely burdened. This leads to the fact that the participating components can become very hot and, thus, certain temperature classes for intrinsic safety, especially the temperature class 6, according to which a maximum surface temperature must not exceed 85/80° C., cannot be satisfied. Furthermore, dangerous voltages are present in the circuit of the switching power supply, even though the input voltage is comparatively low.

SUMMARY

An object of the invention is to provide a switching power supply, which upon malfunction turns off, or stops working, as safely as possible.

The object is achieved by a primary-clocked switching power supply as defined in claim 1 and by a field device of automation technology as defined in claim 15. Advantageous further developments of the invention are set forth in the dependent claims.

The primary-clocked switching power supply of the invention for converting an input voltage into an output voltage comprises:
  a primary side circuit branch, where the input voltage can be applied;
  isolated from the primary side circuit branch, a secondary side circuit branch, where the output voltage is tappable;
  between the primary side circuit branch and the secondary side circuit branch, a galvanic isolation, which includes at least one transformer, wherein the transformer includes at least a first primary winding arranged in the primary side circuit branch and a first secondary winding arranged in the secondary side circuit branch for galvanically isolated energy transfer from the primary side to the secondary side circuit branch, wherein the transformer, furthermore, has a second primary winding arranged in the primary side circuit branch for energy supply of at least parts of the primary side circuit branch;
  a fuse or circuit breaker arranged in the primary side circuit branch and adapted to interrupt a primary side electrical current flow, so that the primary side circuit branch is essentially voltage-free;
  a first switchable switch element, which is arranged in the primary side circuit branch relative to the fuse or circuit breaker in such a manner that switching trips the primary side fuse or circuit breaker;
  a monitoring unit connected with the first switch element and arranged in the primary side circuit branch and adapted to monitor a characteristic electrical signal determined by the second primary winding and, when the characteristic electrical signal exceeds a threshold value, to switch the first switch element, so that the primary side fuse or circuit breaker is tripped.

An advantageous embodiment of the invention provides that the characteristic electrical signal comprises a voltage signal dependent on the second primary winding, especially a voltage signal on the output of the second primary winding.

Another advantageous embodiment of the invention provides, furthermore, a diode arranged in the primary side circuit branch, wherein the diode is connected via its anode with the second primary winding and the characteristic electrical signal comprises a voltage signal on a cathode of the diode.

Another advantageous embodiment of the invention provides that the monitoring unit has at least one comparator, especially a Schmitt trigger, which is supplied the electrical signal and which compares the electrical signal with the threshold value and when the electrical signal exceeds the threshold value, switches the first switch element.

In turn, an advantageous embodiment of the invention provides that the monitoring unit has an RC unit, which is connected with the second primary winding in such a manner that the RC unit sums the voltage dependent on the second primary winding. Especially, the embodiment can provide that the RC unit and the comparator are connected with one another in such a manner that the comparator is supplied the voltage summed by the RC unit and wherein the comparator compares the summed voltage with the threshold value.

Another advantageous embodiment of the invention provides that the comparator is embodied in such a manner that the threshold value is fed to a first input.

In turn, an advantageous embodiment of the invention provides that the comparator is, furthermore, embodied in such a manner that the electrical signal is fed to a second input.

Another advantageous embodiment of the invention provides that the first switch element comprises a thyristor, a transistor, especially a field effect transistor, or a relay.

Another advantageous embodiment of the invention provides that the primary side circuit branch has a second switch element, which is connected in series with the first primary winding and clocks the first primary winding. Especially, the embodiment can provide that the primary side circuit branch has a control unit connected with the second switch element for activating the second switch element and/or that there is provided in the primary side circuit branch a starter circuit, which supplies the control unit at start with required energy. Furthermore, the embodiment can have at least a first feedback element, which is embodied in such a manner that it leads a feedback signal from the secondary side circuit branch across the galvanic isolation to the control unit arranged on the primary side, so that the control unit activates the second switch element for clocking the first primary winding corresponding to the feedback signal and/or that the first feedback element comprises at least one optical coupling element, preferably an optocoupler or an infrared light emitting diode.

As regards the field device, the object is achieved by a field device of automation technology, which includes at least one primary-clocked switching power supply according to one of the above described embodiments.

BRIEF DESCRIPTION OF THE DRAWINGS

The invention will now be explained in greater detail based on the appended drawing, the figures of which show as follows:

FIG. 1 shows a primary-clocked switching power supply 1, which has a primary side circuit branch 2 and a secondary side circuit branch 4 separated therefrom by a galvanic isolation 3.

DETAILED DESCRIPTION

Figure 1:
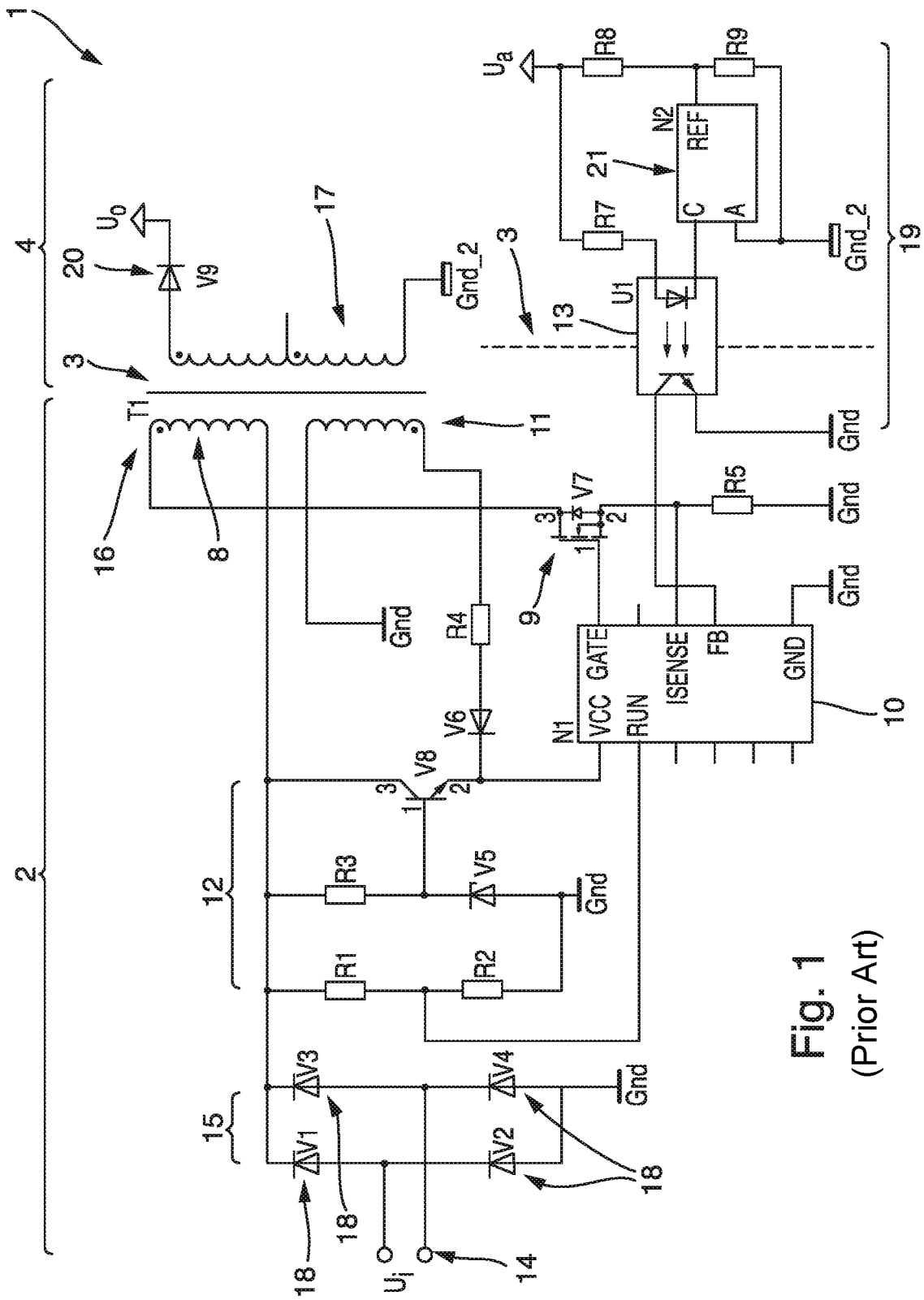
FIG. 1 shows a circuit of a primary-clocked switching power supply known from the state of the art.

The primary side circuit branch 2 of the switching power supply 1 of FIG. 1 includes a first circuit branch region with at least one input connection 14, a rectifier unit 15, a starter circuit 12, a first primary winding 8 of a transformer 16, a second switch element 9 and a control unit 10.

The input connection 14 serves for inputting an input voltage $U_i$ to the switching power supply 1. Depending on embodiment of the switching power supply 1, both an AC wide-range input voltage of typically 80 to 253 V AC as well as also a DC input voltage of typically 18 to 65 V DC can be applied to the input connection 14.

The input voltage $U_i$ is, in the case, in which it is an alternating voltage, rectified by the rectifier unit 15. Rectifier unit 15 is, as a rule, a bridge rectifier, which is composed of four diodes 18. The rectified input voltage $U_i$ is then fed to a starter circuit 12, which, in the start phase, typically only the first clock cycles, provides the required electrical energy for switching power supply 1. Based on the electrical energy provided by the starter circuit 12, the control unit 10 is operated, which serves for activating the second switch element 9 with a desired clocking frequency. Usual clocking frequencies lie, depending on power, between 20 and 300 kHz. Modern control units, or control chips, are due to the high clocking frequencies and duty factors of up to 80% able to drive correspondingly high powers. The second switch element 9, for example, a transistor, is connected in series with a first primary winding 8 of the transformer 16 and clocks the first primary winding 8 corresponding to the clocking frequency predetermined by the control unit 10, in order to withdraw energy portions from the input voltage $U_i$ and to transmit, or transform, them to a secondary winding 17 of the transformer 16 in the secondary side circuit branch 4. Based on such transmitted energy portions, a consumer, which is connectable to the secondary side circuit branch, can be supplied with energy.

Furthermore, the primary side circuit branch 2 of the switching power supply of FIG. 1 has a second circuit branch region, which essentially serves for energy supply of the control unit 10. The second circuit branch region includes a second primary winding 11 of the transformer 16. The second primary winding 11 is connected with the starter circuit 12 in such a manner via other components, for example, a resistance arranged in series with second primary winding as well as a diode likewise arranged in series with the resistance and the second primary winding, that as soon as sufficient energy is available via the second primary winding 11 for supplying the control unit 10, energy supply occurs via the second circuit branch region.

The secondary side circuit branch 4 includes, such as already mentioned, the secondary winding 17 of the transformer 16 and a smoothing means 20 for smoothing the discontinuous energy flux across the transformer 16. In the simplest case, the smoothing means comprises a smoothing diode 20. Furthermore, the secondary side circuit branch 4 includes a feedback circuit 19 adapted to feed back a galvanically decoupled feedback signal from the secondary side circuit branch 4 to the primary side circuit branch 2, in order to adapt the clocking frequency of the control unit 10 appropriately. Typically, the feedback circuit 19 includes for this a voltage reference 21, which is designed in such a manner that when the voltage applied on its input REF exceeds a predetermined threshold value, e.g. 2.5 V, the voltage reference 21 causes an electrical current flow between its connections C and A, in order to produce the feedback signal.

The galvanic decoupling can be implemented, for example, by including in the feedback circuit 19 a first feedback element 13, which connects the secondary side circuit branch and primary side circuit branch with one another.

The circuit of the switching power supply 1 shown in FIG. 1 is greatly simplified and includes, for example, no safety measures known from the state of the art and mentioned above, especially it does not include a secondary side arranged switch element and fuse, such as usual in the state of the art. Furthermore, the circuit of FIG. 1 includes no measures as regards electromagnetic compatibility (EMC).

Figure 2:
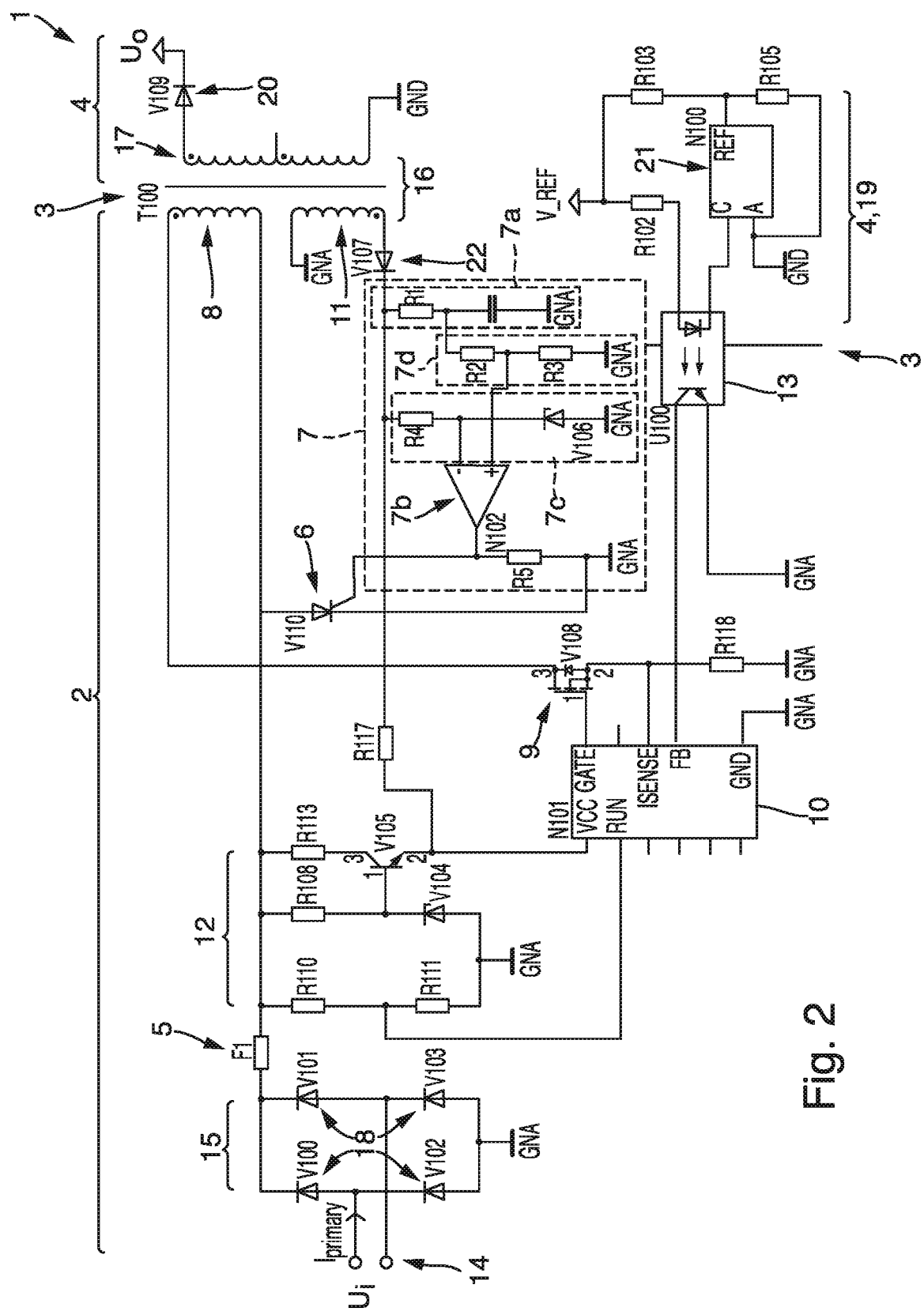
FIG. 2 shows a circuit of a primary-clocked switching power supply embodied according to the present disclosure.

FIG. 2 shows, by way of example, a circuit of the primary-clocked switching power supply 1 embodied according to the invention, which, compared with the circuit of FIG. 1, is expanded to include a monitoring unit 7 arranged on the primary side, a first switch element 6 likewise arranged on the primary side, as well as a primary side fuse or circuit breaker 5. It should be mentioned here that while FIGS. 1 and 2 show an AC switching power supply, the teachings of the invention can also be applied without problem for a DC/DC power supply.

The monitoring unit 7, the first switch element 6 and the primary side fuse or circuit breaker 5 serve, upon malfunction, for example, upon the occurrence of an overvoltage, to remove voltage from the primary side of the switching power supply 1, so that no further consequential failures and/or thermal loadings can occur. Due to the fact that both the monitoring unit 7 and the first switch element 6 are arranged on the primary side, a sending of a signal from the secondary side to the primary side across the galvanic isolation 3 for activating the first switch element 6 is not necessary. This enables that the switching power supply of the invention can be applied in advantageous manner for field devices of automation technology, on which according to SIL (Safety Integrity Level) and/or Ex provisions especially high technical requirements are placed.

The solution of the invention shown in FIG. 2 by way of example includes in the primary side circuit branch 2 a fuse or circuit breaker 5, preferably a melting fuse, which interrupts the primary side electrical current flow $I_{primary}$ upon the exceeding of a defined electrical current level for a defined duration. In order that the fuse or circuit breaker 5 interrupts the primary side electrical current flow, furthermore, a first switch element 6 is provided in the primary side of the switching power supply. First switch element 6 is switchable by a control signal.

The first switch element 6 is, in such case, arranged in such a manner in the primary side circuit branch that, upon switching, the primary side fuse or circuit breaker 5 is tripped. Such can be implemented, for example, by connecting the fuse or circuit breaker 5 to ground through the first switch element 6 upon the switching of the first switch element 6, i.e. when it becomes conducting.

The first switch element 6, which preferably comprises a thyristor or field effect transistor, is operated by a monitoring unit in such a manner that, in the case of malfunction, e.g. in the case of an overvoltage, it becomes conductive. Besides the thyristor or field effect transistor, the first switch element 6 can alternatively comprise a bipolar transistor or a relay.

Monitoring unit 7 includes a comparator 7b, for example, a Schmitt trigger, to which is fed to a first input (negative pole, or inverting input) a threshold value and to a second input (positive pole, or non-inverting input) an electrical signal, which is determined, or defined, by the second primary winding 11. The electrical signal can comprise, for example, a voltage signal, which is present across the second primary winding of the transformer. The voltage signal can, in such case, either be tapped on an output of the second primary winding 11, i.e. on the output opposite ground, or after a diode 22 connected in series with the second primary winding. In the circuit of FIG. 2, the voltage signal is registered, by way of example, after the diode on its cathode and fed to the comparator. Besides the voltage signal as characteristic electrical signal, it is possible, in principle, also to take into consideration an electrical current signal as characteristic electrical signal.

The characteristic electrical signal can, in principle, be fed directly, i.e. without interpositioning of other electrical components, to the comparator 7b. Advantageously, however, the electrical signal, especially when this comprises the voltage signal, is fed via an RC unit (resistor-capacitor unit) 7a to the comparator 7b. The RC unit 7a has a summing effect on the electrical signal, so that not a purely peak detection is performed by the comparator 7b. This offers the advantage that the electrical signal is less disturbance susceptible, especially as regards EMC disturbances.

Furthermore, depending on concrete embodiment of the circuit, also an adapting unit 7d can be provided for adapting, especially voltage adapting, of the characteristic electrical signal. The adapting unit 7d is fed the electrical signal, or the summed signal. In the example of FIG. 2, the adapting unit 7d comprises a voltage divider having two resistors connected in series relative to one another and so dimensioned that a level, especially a voltage level, of the characteristic electrical signal, or of the totaled signal, lies at a desired level.

The desired level depends on a threshold value, which is fed via a threshold value circuit 7c to the comparator 7b as comparison reference. The threshold value is, in turn, fixed by the threshold value circuit 7c as a function of whether the electrical signal is tapped directly on the output of the second primary winding 11 or on the cathode of the diode 22. In the circuit of FIG. 2, the threshold value circuit 7c comprises a Zener diode and a resistor connected therewith in series, wherein the threshold value is led from a center tap between the Zener diode and the resistor to the first input (negative pole, or inverting input) of the comparator 7b.

The comparator 7b is adapted to compare the supplied electrical signal with the threshold value and as a function of the comparison to control the first switch element 6 via a control signal. The comparator 7b shown in FIG. 2 compares the supplied electrical signal with the threshold value and places on an output the control signal, which displays, whether the electrical signal or the threshold value is higher. When the electrical signal on the second input (positive, or non inverting input) is higher than the threshold value applied to the first input (negative, or inverting input), then the control signal approximates a positive supply voltage of the comparator 7b, so that the first switch element 6 is switched, or fired, by the control signal and the fuse or circuit breaker 5 trips. Because of the tripping of the fuse or circuit breaker 5, then the primary side electrical current flow $I_{primary}$ is interrupted and the switching power supply primary side shuts down.

The invention claimed is:

1. A primary-clocked switching power supply for converting an input voltage into an output voltage, comprising:
   a primary side circuit branch where the input voltage can be applied;
   a secondary side circuit branch where the output voltage is tappable, wherein the secondary side circuit branch is galvanically isolated from the primary side circuit branch;
   a galvanic isolation which includes a transformer, wherein the galvanic isolation is between the primary side circuit branch and the secondary side circuit branch, wherein the transformer includes a first primary winding arranged in the primary side circuit branch and a first secondary winding arranged in the secondary side circuit branch for galvanically isolated energy transfer from the primary side to the secondary side circuit branch, and wherein the transformer further includes a second primary winding arranged in the primary side circuit branch for energy supply of at least parts of the primary side circuit branch;
   a fuse or circuit breaker arranged in the primary side circuit branch and adapted to interrupt a primary side electrical current flow so that the primary side circuit branch is essentially voltage-free;
   a first switch which is arranged in the primary side circuit branch relative to the fuse or circuit breaker such that switching the switch trips the primary side fuse or circuit breaker; and
   a monitoring unit connected with the first switch and arranged in the primary side circuit branch and adapted to monitor a characteristic electrical signal determined by the second primary winding and, when the characteristic electrical signal exceeds a threshold value, to switch the first switch, so that the primary side fuse or circuit breaker is tripped.

2. The switching power supply as claimed in claim 1, wherein the characteristic electrical signal includes a voltage signal dependent on the second primary winding including a voltage signal on an output of the second primary winding.

3. The switching power supply as claimed in claim 1, further comprising:
   a diode arranged in the primary side circuit branch, wherein the diode is connected via its anode with the second primary winding and the characteristic electrical signal includes a voltage signal on a cathode of the diode.

4. The switching power supply as claimed in claim 1, wherein the monitoring unit includes a comparator including a Schmitt trigger that is supplied the characteristic electrical signal and which compares the characteristic electrical signal with the threshold value and when the characteristic electrical signal exceeds the threshold value, switches the first switch element.

5. The switching power supply as claimed in claim 1, wherein the monitoring unit has an RC unit which is connected with the second primary winding such that the RC unit sums the voltage signal dependent on the second primary winding.

6. The switching power supply as claimed in claim 5, wherein the RC unit and the comparator are connected with one another such that the comparator is supplied the voltage summed by the RC unit and wherein the comparator compares the summed voltage with the threshold value.

7. The switching power supply as claimed in claim 4, wherein the comparator is embodied in such a manner that the threshold value is fed to a first input of the comparator.

8. The switching power supply as claimed in claim 4, wherein the comparator is further embodied such that the electrical signal is fed to a second input of the comparator.

9. The switching power supply as claimed in claim 1, wherein the first switch element includes a thyristor, a transistor, a field effect transistor, or a relay.

10. The switching power supply as claimed claim 1, wherein the primary side circuit branch further includes a second switch which is connected in series with the first primary winding and clocks the first primary winding.

11. The switching power supply as claimed in claim 10, wherein the primary side circuit branch further includes a control unit connected with the second switch for activating the second switch.

12. The switching power supply as claimed in claim 11, wherein the primary side circuit branch further includes a starter circuit which supplies the control unit at start with required energy.

13. The switching power supply as claimed in claim 11, further comprising a first feedback element which is embodied such that it leads a feedback signal from the secondary side circuit branch across the galvanic isolation to the control unit arranged on the primary side, so that the control unit activates the second switch for clocking the first primary winding corresponding to the feedback signal.

14. The switching power supply as claimed in claim 13, wherein the first feedback element includes an optical coupling element including an optocoupler or an infrared light emitting diode.

15. A field device of automation technology comprising:
    a primary-clocked switching power supply, the primary-clocked switching power supply including:
      a primary side circuit branch where the input voltage can be applied;
      a secondary side circuit branch where the output voltage is tappable, wherein the secondary side circuit branch is galvanically isolated from the primary side circuit branch;
      a galvanic isolation which includes a transformer, wherein the galvanic isolation is between the primary side circuit branch and the secondary side circuit branch, wherein the transformer includes a first primary winding arranged in the primary side circuit branch and a first secondary winding arranged in the secondary side circuit branch for galvanically isolated energy transfer from the primary side to the secondary side circuit branch, and wherein the transformer further includes a second primary winding arranged in the primary side circuit branch for energy supply of at least parts of the primary side circuit branch;
      a fuse or circuit breaker arranged in the primary side circuit branch and adapted to interrupt a primary side electrical current flow so that the primary side circuit branch is essentially voltage-free;
      a first switch which is arranged in the primary side circuit branch relative to the fuse or circuit breaker such that switching the switch trips the primary side fuse or circuit breaker; and
      a monitoring unit connected with the first switch and arranged in the primary side circuit branch and adapted to monitor a characteristic electrical signal determined by the second primary winding and, when the characteristic electrical signal exceeds a threshold value, to switch the first switch, so that the primary side fuse or circuit breaker is tripped.

* * * * *